No. 848,025. PATENTED MAR. 26, 1907.
J. P. GOLDEN.
GEARING FOR CANE MILLS.
APPLICATION FILED JULY 26, 1904.
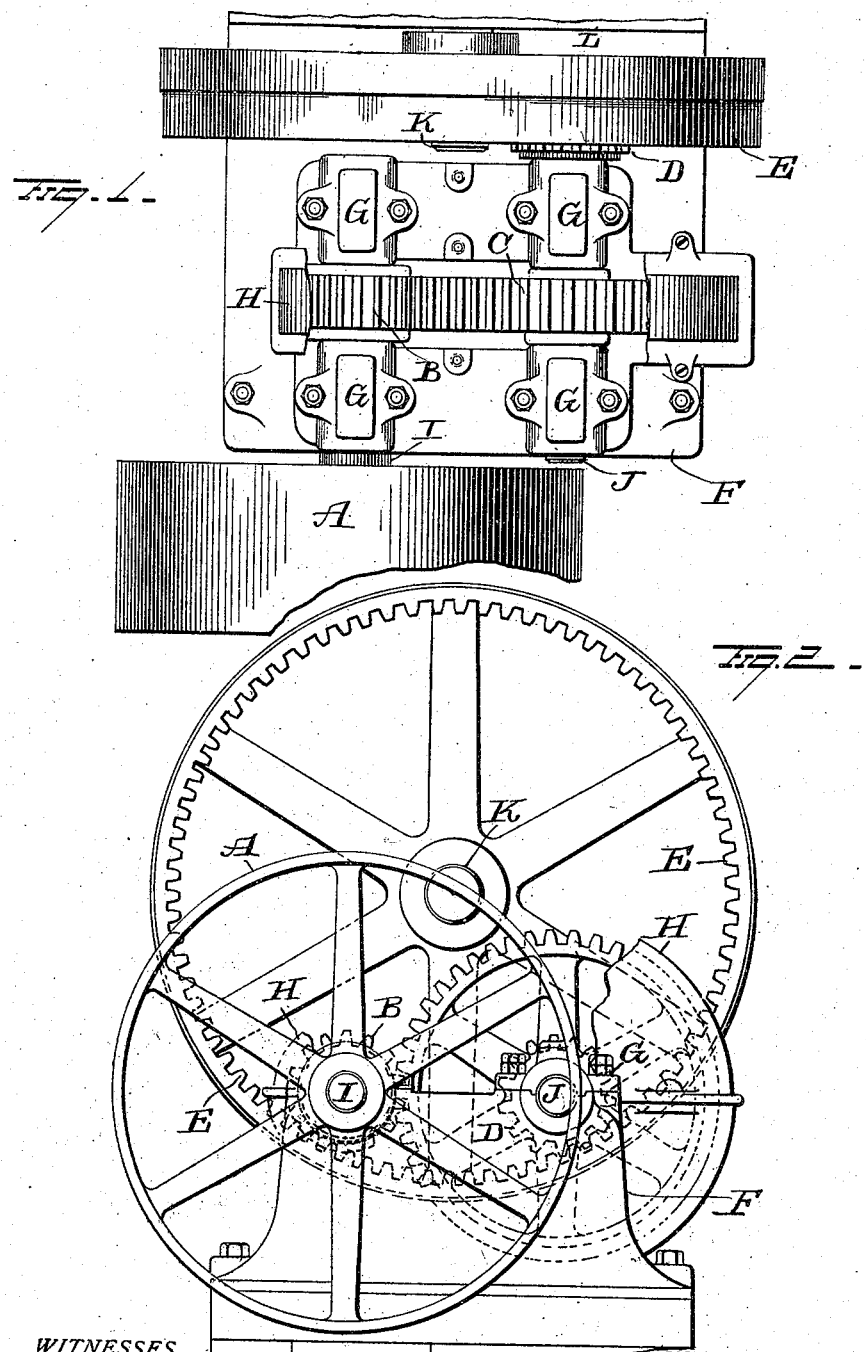

UNITED STATES PATENT OFFICE.

JOHN PORTER GOLDEN, OF COLUMBUS, GEORGIA.

GEARING FOR CANE-MILLS.

No. 848,025.　　　　Specification of Letters Patent.　　　　Patented March 26, 1907.

Application filed July 26, 1904. Serial No. 218,230.

*To all whom it may concern:*

Be it known that I, JOHN PORTER GOLDEN, a resident of Columbus, in the county of Muscogee and State of Georgia, have invented certain new and useful Improvements in Gearing for Cane-Mills; and I do hereby declare the following to be a full, clear, and exact description of the invention, such as will enable others skilled in the art to which it appertains to make and use the same.

My invention relates to an improved gearing for horizontal cane-mills, the object of the invention being to provide an improved gearing which will economize space and in which the gears are fully protected; and the invention consists in certain novel features of construction and combinations and arrangements of parts, as will be more fully hereinafter described, and pointed out in the claim.

In the accompanying drawings, Figure 1 is a plan view illustrating my improvements and Fig. 2 is a view in end elevation with gear-casing broken away.

My invention is designed as an improvement over the ordinary style of horizontal power cane-mills with self-contained gearing where the circumferential speed of the rolls crushing the cane is approximately twenty-five feet per minute, while the pulley driving the train runs approximately one hundred and seventy-five, double-geared. This style of gearing usually consists of a small gear on the pulley-shaft gearing into a larger gear on the pinion-shaft, with another small gear on the pinion-shaft end gearing into a large gear on the main crushing-roll shaft, and with a gear at the opposite end engaging two smaller-geared rolls in contact with large roll. The usual construction is to leave the gearing entirely exposed, and my improved style of gearing is designed by its relative location to make a narrower mill, with the large internal gear constituting its own guard, while all other gears have suitable guards, the object being to provide a safe mill unlike former mills of this type.

On a bed-plate F (which may be a portion of the frame of a cane-mill with which my improvements are intended for use) a driving-shaft I and a driven shaft J are mounted, and over these shafts wick oiling-caps G are placed. A pulley A is secured to the projecting end of shaft I and receives motion from any convenient source of power. A pinion B is secured to the shaft I between the bearings thereof and transmits motion to a gear C, secured to the shaft J, between the bearings of the latter. A pinion D is secured to one end of the shaft J and is preferably of the same diameter as the pinion B, and this pinion D meshes with a large internal gear E on the journal of the mill-roll L. A gear cover or housing H incloses the gears B and C.

By constructing my improvements as above explained the gearing is rendered more compact, as it is narrower, and the gears are fully protected from any accumulation of material which might otherwise collect thereon.

Having fully described my invention, what I claim as new, and desire to secure by Letters Patent, is—

In gearing for cane-mills, the combination with a bed-plate, of parallel driving and driven shafts mounted on said bed-plate, two bearings on the bed-plate for each of said shafts, a pinion on the driving-shaft between the bearings thereof, a gear on the driven shaft between the bearings thereof and meshing with said pinion, a housing inclosing said pinion and gear, an internally-toothed gear to be secured to the shaft of the large crushing-roll of the mill, a pinion on the inner end of the driven shaft and meshing with said internally-toothed gear, and a pulley on the outer end of the driving-shaft.

In testimony whereof I have signed this specification in the presence of two subscribing witnesses.

JOHN PORTER GOLDEN.

Witnesses:
　C. D. McPHAIL,
　N. L. DUDLEY.